US007730981B2

(12) United States Patent
McCabe et al.

(10) Patent No.: US 7,730,981 B2
(45) Date of Patent: Jun. 8, 2010

(54) LIFT TRUCK WITH HYBRID POWER SOURCE

(75) Inventors: Paul P. McCabe, Binghamton, NY (US); Bryce A. Gregory, Binghamton, NY (US); Richard M. Day, Port Crane, NY (US)

(73) Assignee: The Raymond Corporation, Greene, NY (US)

( * ) Notice: Subject to any disclaimer, the term of this patent is extended or adjusted under 35 U.S.C. 154(b) by 752 days.

(21) Appl. No.: 11/550,961

(22) Filed: Oct. 19, 2006

(65) Prior Publication Data

US 2007/0090808 A1    Apr. 26, 2007

Related U.S. Application Data

(60) Provisional application No. 60/728,689, filed on Oct. 19, 2005.

(51) Int. Cl.
*B60K 6/44* (2007.10)
(52) U.S. Cl. .............................. 180/65.225; 180/65.22; 180/65.27; 320/137
(58) Field of Classification Search ................ 180/65.3, 180/65.225
See application file for complete search history.

(56) References Cited

U.S. PATENT DOCUMENTS

| 6,534,950 | B2 | 3/2003 | LeBoe | |
| 6,559,621 | B2* | 5/2003 | Corless et al. | 320/103 |
| 6,616,424 | B2* | 9/2003 | Raiser | 417/411 |
| 7,423,391 | B2* | 9/2008 | Oyobe et al. | 318/139 |
| 2003/0118876 | A1* | 6/2003 | Sugiura et al. | 429/9 |
| 2004/0159480 | A1* | 8/2004 | Ishikawa et al. | 180/65.3 |
| 2004/0172206 | A1 | 9/2004 | Saeki et al. | |
| 2005/0110453 | A1* | 5/2005 | Lecky | 320/101 |
| 2005/0139399 | A1* | 6/2005 | Gopal | 180/65.1 |
| 2006/0029846 | A1* | 2/2006 | Konoto et al. | 429/23 |
| 2006/0061922 | A1* | 3/2006 | Mihai et al. | 361/20 |
| 2006/0078773 | A1* | 4/2006 | Speranza et al. | 429/23 |
| 2006/0127704 | A1* | 6/2006 | Raiser | 429/9 |

* cited by examiner

*Primary Examiner*—S. Joseph Morano
*Assistant Examiner*—Erez Gurari
(74) *Attorney, Agent, or Firm*—Quarles & Brady LLP (57) ABSTRACT

A lift truck power source includes a hybrid power supply including a storage battery, a capacitor bank, and optionally a fuel cell. The capacitor bank stores power produced during regeneration by either the truck traction system or the lift system and delivers current when current demand exceeds that delivered by the fuel cell. The storage battery or fuel cell acts as a main power supply to deliver current at a rate sufficient to power the lift truck. When the fuel cell is the main power supply, the storage battery stores power during times when current demand is less than that delivered by the fuel cell and delivers current at times when current demand is greater than that delivered by the fuel cell. When the storage battery is the main power supply, the fuel cell supplements the power delivered by the storage battery, and can also recharge the storage battery.

10 Claims, 7 Drawing Sheets

LIFT TRUCK WITH HYBRID POWER SOURCE

CROSS-REFERENCE TO RELATED APPLICATION

This application claims priority to U.S. Provisional Application Ser. No. 60/728,689, filed Oct. 19, 2005, hereby incorporated by reference.

BACKGROUND OF THE INVENTION

The field of the invention is electric powered material handling vehicles, and more particularly lift trucks which perform lifting operations under a variety of operating conditions.

Electric powered lift trucks employ large lead acid batteries to provide energy for their traction systems and their lift systems. The battery typically delivers from 24 to 48 volts to a DC bus and a traction system is powered from this bus to move the truck around the workplace under the control of an operator or a computer. The traction system can draw large currents from the DC bus during truck acceleration or when moving the truck up an incline, and it can regenerate current into the DC bus when "plugging" during truck deceleration or movement down an incline.

The lift system typically consumes half the power during normal truck operation. When lifting heavy loads the lift system draws current from the DC bus and when lowering a load it may regenerate current back to the DC bus.

A conventional lift truck will typically operate from 5 to 6 hours on a fully charged battery. When the battery voltage drops below a certain level the truck is driven to a battery station where the depleted battery is removed and a fully charged replacement battery is installed. This operation typically requires from 20 to 30 minutes during which the truck and operator are nonproductive.

Efforts have been made to increase the efficiency of these drive systems and to thereby lengthen the time period between battery changes. This includes recharging the battery during truck operation with the currents regenerated by the traction system and the lift system. While this approach does recover some of the energy, lead acid batteries are very inefficient energy recovery devices and much of the regenerated energy is wasted as heat produced in the battery. Also, the high current peaks that can occur during truck operation can limit battery life.

SUMMARY OF THE INVENTION

The present invention is a hybrid power source for an electric lift truck which efficiently recaptures energy regenerated by the traction and lift systems and which generates electrical energy using an on-board fuel cell. The hybrid power source includes a storage battery that may be recharged from external circuitry but in normal truck operation is maintained in a charged condition by an on-board fuel cell. A capacitor bank connects to the storage battery and efficiently stores energy regenerated by the lift system and traction system during truck operation and returns that energy to operate the truck.

A general object of the invention is to provide an efficient power source for an electric lift truck. Significant energy regenerated by the lift system and the traction system is captured by the capacitor bank and efficiently returned to power the truck. Efficiency is further enhanced by a lift system which directly powers truck auxiliary functions during load lowering operations.

Another general object of the invention is to reduce the amount of truck downtime. Under normal operating conditions the battery does not require replacing, but is instead recharged by the fuel cell. The truck is periodically refueled, but this refueling requires about one tenth the time needed to replace the battery. The fuel cell is sized to provide the total energy needed by the truck over a typical work shift and the storage battery and capacitor bank handle the fluctuations in energy demand that occur over that work shift. The storage battery stores energy produced by the fuel cell during periods of low energy demand and the capacitor bank stores energy during periods of energy regeneration. Both of these storage devices return their stored energy when truck energy demand exceeds the peak capacity of the fuel cell.

The foregoing and other objects and advantages of the invention will appear from the following description. In the description, reference is made to the accompanying drawings which form a part hereof, and in which there is shown by way of illustration a preferred embodiment of the invention. Such embodiment does not necessarily represent the full scope of the invention, however, and reference is made therefore to the claims and herein for interpreting the scope of the invention.

DETAILED DESCRIPTION OF THE PREFERRED EMBODIMENT

Figure 3:
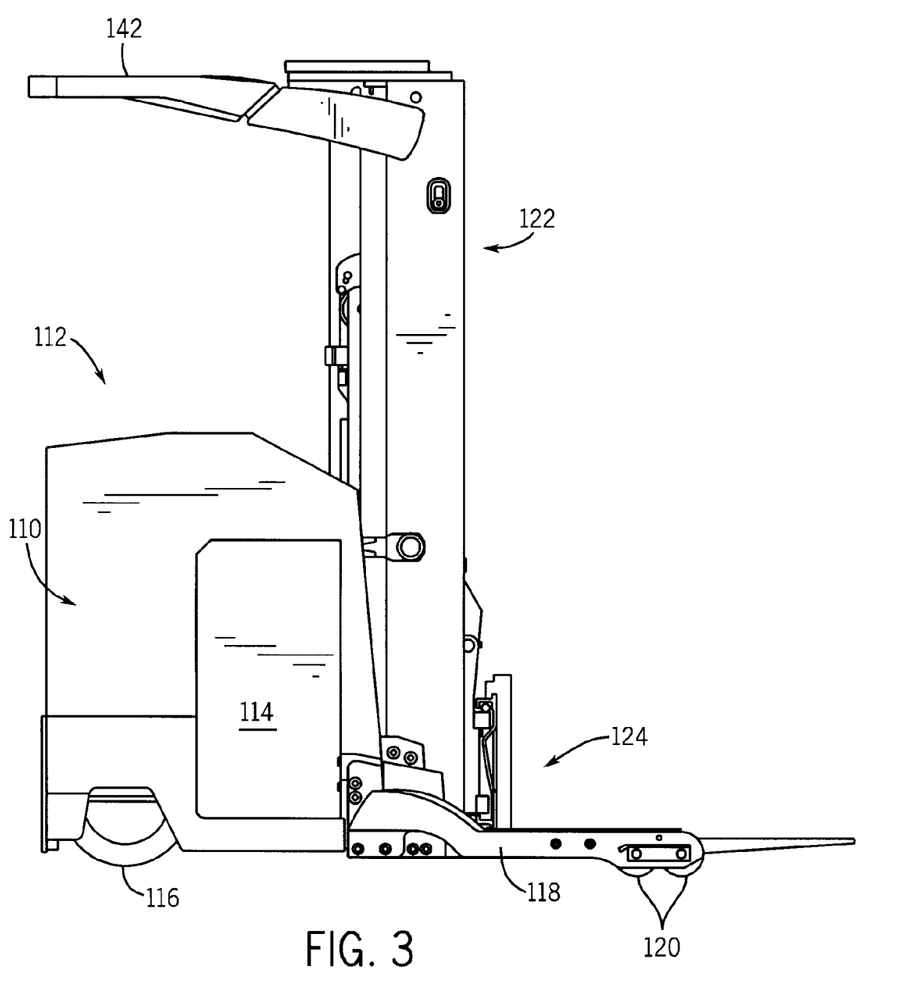
FIG. 3 is a side elevation view of an exemplary lift truck which employs the power sources of FIG. 1, 2, 4, or 7.

Referring particularly to FIG. 3, a lift truck which employs a preferred embodiment of the invention includes a power unit 110 having an operator's compartment 112 located to the rear and a power source compartment 114 located at the forward end. As will be described in detail below, a power source including a battery, a capacitor bank, and optionally, a fuel cell are located in the compartment 114, and they supply power to a traction motor drive (not shown) which rotates a steerable drive wheel 116 to propel and steer the lift truck. A pair of laterally spaced baselegs 118 indirectly connect to, and extend forward from the power unit 110, and each baseleg includes wheels 120 which support the truck. A mast 122 connects to the front end of the power unit 110 and extends vertically upward therefrom. The mast 122 supports a fork carriage 124 which can be elevated to different heights by operation of a lift system.

Figure 1:
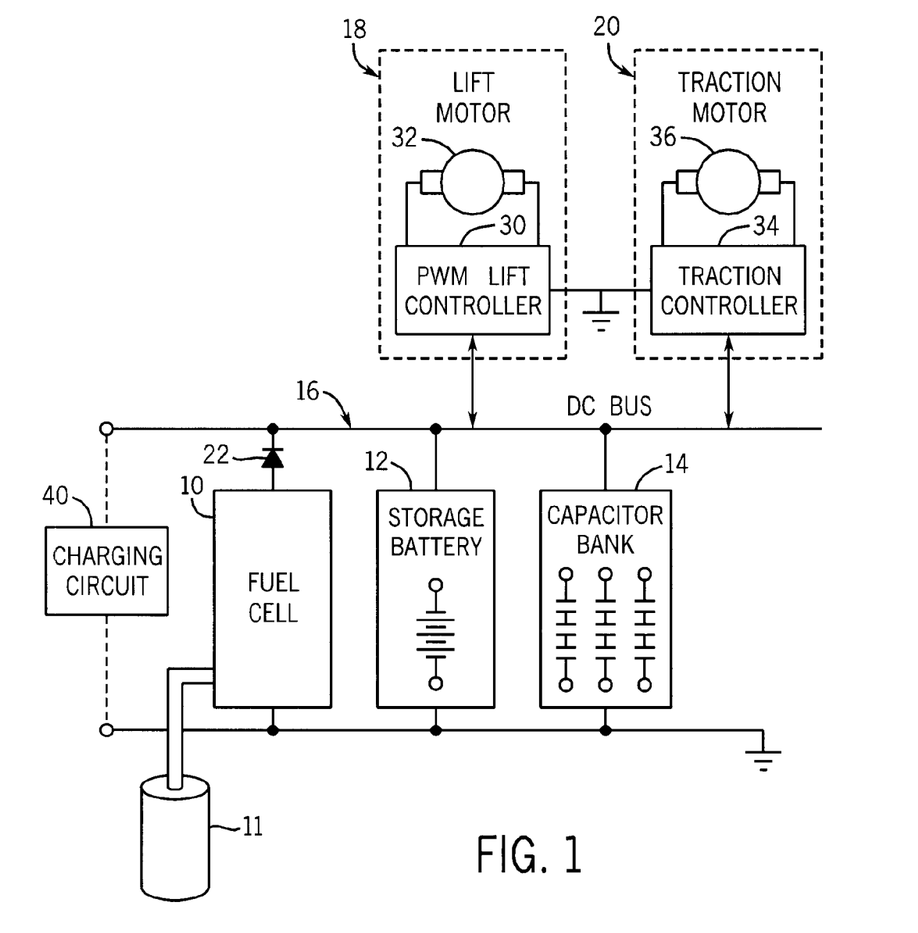
FIG. 1 is a block diagram of a first preferred embodiment of a lift truck power source.

Referring particularly to FIG. 1, a first preferred embodiment of the invention is a power system comprised of a fuel cell 10, a storage battery 12 and a capacitor bank 14, all coupled to a DC bus 16. The DC bus 16 supplies electric power to the truck, and more specifically to a lift system 18 and a traction system 20. The DC bus 16 typically has a nominal DC voltage of from 24 volts to 48 volts.

The fuel cell 10 provides a constant source of electrical energy for the truck through a diode 22. The fuel cell 10 combines hydrogen stored in an on-board tank 11 with oxygen from the air to produce electric power (voltage and current) with byproducts of water and heat. The fuel cell 10 operates at a high enough voltage to charge the battery 12 as given by the following expression:

$$V_{fc} = (V_{nom} * 1.14) + V_d$$

where, $V_{fc}$ is the output voltage of the fuel cell, $V_{nom}$ is the nominal battery voltage, and $V_d$ is the voltage across the diode 22.

The fuel cell supplies current at a rate sufficient to supply the average power needs of the truck. It can be viewed as an on-board battery charger. For example, if a battery-only system is being replaced by a fuel cell-battery-supercapacitor energy source, a 900 amperehour battery with a six hour rating of 150 amps would need a fuel cell that provides at least 150 amps continuous. A fuel cell such as the PowerFlow 5.0 kw Fuel Cell Power Module commercially available from Nuvera Fuel Cells, Inc. of Cambridge MA may be used for this purpose.

The diode 22 blocks current from flowing back into the fuel cell 10 when the bus voltage increases during regeneration. Fuel cells are not designed to absorb currents produced during regeneration and the diode 22 blocks such currents and protects the fuel cell from damage. Although a diode 22 is shown here, a switching element or switching circuit can be used in place of the diode 22.

The storage battery 12 may be a lead acid battery with a voltage that of the nominal DC bus voltage. The battery 12 is sized to provide enough reserve capacity to provide the supplemental energy needed at the highest vehicle cycle rate. The battery 12 acts in a load leveling capacity to supply additional current that the vehicle needs for acceleration, climbing a ramp or lifting a heavy load. The battery 12 supplements the output of the fuel cell 10 when the demand for power exceeds the current capacity of the fuel cell 10. The fuel cell 10 in return, recharges the battery 12 when the demand for power is low. In the above example where the fuel cell 10 delivers 150 amps continuously, the battery 12 may have, for example, a capacity of 100 to 150 ampere hours to combine with the power provided by the fuel cell 10.

The capacitor bank 14 is comprised of one or more "banks" of series-connected supercapacitors. Supercapacitors are commercially available devices that combine the fast transient voltage capability of a capacitor with the electrochemical energy storage ability of a battery. They are presently available in sizes as large as 2000-3000 Farads at 2.5 volts each from Maxwell Technologies of San Diego, Calif. In a typical 36V (nominal) DC bus system, the stabilized open-cell battery voltage ranges between 35.5 and 38.5 volts. If the battery voltage is measured immediately after charging, the DC bus voltage in such a system can be as high as 40-42 volts. If the capacitor bank 14 is sized to operate in this system, a "bank" of 17 capacitors is connected in series for a maximum of 42.5 volts. If the capacitors used are each rated at 2600 Farads, the total capacitance is about 153 Farads. The power stored by the capacitor bank 14 may be calculated using the expression:

$$P = \frac{C * V^2}{2}$$

where,

P=Power (joules or watts-seconds)

C=Capacitance (Farads)

V=Volts.

The total energy stored per "bank" in this example is 138,178 joules, and to get more energy storage capacity, additional "banks" of capacitors are connected in parallel.

In the preferred embodiment shown in FIG. 1, the bank of capacitors 14 is wired in parallel with the battery 12. In this configuration, the capacitors will charge to the voltage of the battery. The fast transient capability of the capacitors allows them to absorb energy more quickly and efficiently than the battery 12 when a charging voltage is created or when a regenerative action occurs. In addition, the capacitors 14 help "hold up" the battery voltage when there are sudden high current demands on the battery 12. This occurs because the capacitors 14 discharge readily when there is a demand for current, thus relieving the battery from some of the peak current requirements. This has the effect of "load leveling" for the battery 12. The energy stored within the battery 12 remains relatively constant and the transient energy surges created while in a regenerative mode are efficiently absorbed by the capacitors 14. When sudden energy needs arise, the capacitor bank 14 also more efficiently discharges its stored power. This is because the batteries 12 have a higher internal resistance. When there is a large voltage present, the capacitor bank 14 absorbs the charge more quickly and develops less heat than the battery 12. The net result is that the available charge on battery 12 will last longer because less of the energy is wasted as heat.

Referring still to FIG. 1, the lift system 18 includes a PWM lift controller 30 which receives power from the DC bus 16 and drives a lift motor 32 in response to commands received from the truck operator. During a lifting operation considerable energy is required to raise the fork carriage 124 and the load it supports and the PWM lift controller draws more current from the DC bus 16. On the other hand when the fork carriage 124 is lowered, the dropping fork carriage 124 drives the shaft of the lift motor 32 and effectively turns the motor 32 into an electrical generator. The PWM lift controller 30 has four quadrant operating capabilities and it produces a DC current from generated voltage that is regenerated onto the DC bus 16. Lowering operations typically require from 10 to 20 seconds to perform and from 10% to 13% of the energy delivered to the lift system 18 can be returned to the DC bus 16 by regeneration during lowering operations.

The traction system 20 operates in a similar manner, although the regenerated energy returned to the DC bus 16 typically ranges from only 2-3%. The traction system 20 includes a traction controller 34 which connects to the DC bus 16 and delivers power to a traction motor 36 in response to commands received from the truck operator. During truck acceleration or movement up an incline, considerable current is drawn from the DC bus 16. On the other hand, when the truck decelerates or is moving down an incline, the traction motor 36 is driven like an electrical generator and DC current is regenerated by the traction controller 34 back to the DC bus 16.

Using the hybrid power source of FIG. 1, the various components of the system therefore can each provide power to the DC bus during peak load and the storage battery 12 and capacitor bank 14 can be recharged to increase truck efficiency. During a typical work shift, as described above, the fuel cell 10 can be configured to supply the power needed by the truck. When the fuel cell 10 is the main supply, the fuel cell is powered by the on-board tank of hydrogen, and the storage battery 12 and capacitor bank 14 are provided to deal with power variations. The storage battery 12 is sized to store energy produced by the fuel cell 10 when power demand is low and to deliver that stored energy to the truck when power demand increases above that produced by the fuel cell 10. The capacitor bank 14 is sized to store energy that is regenerated by the lift system 18 and the traction system 20 and to efficiently redeliver that stored energy to the truck during peak loads.

Alternatively, the storage battery 12 can be sized to provide the main source of power to the truck, and the fuel cell 10 and capacitor bank 14 can be configured to provide back-up power and provide additional power during peak loading requirements. Here, the fuel cell 10 can be used both to recharge the storage battery 12 when power demand is low, and also to deliver additional power to the truck when power demand increases. The capacitor bank 14 is again sized to store energy that is regenerated by the lift system 18 and the traction system 20 and to efficiently redeliver that stored energy to the truck during peak loads.

Figure 4:
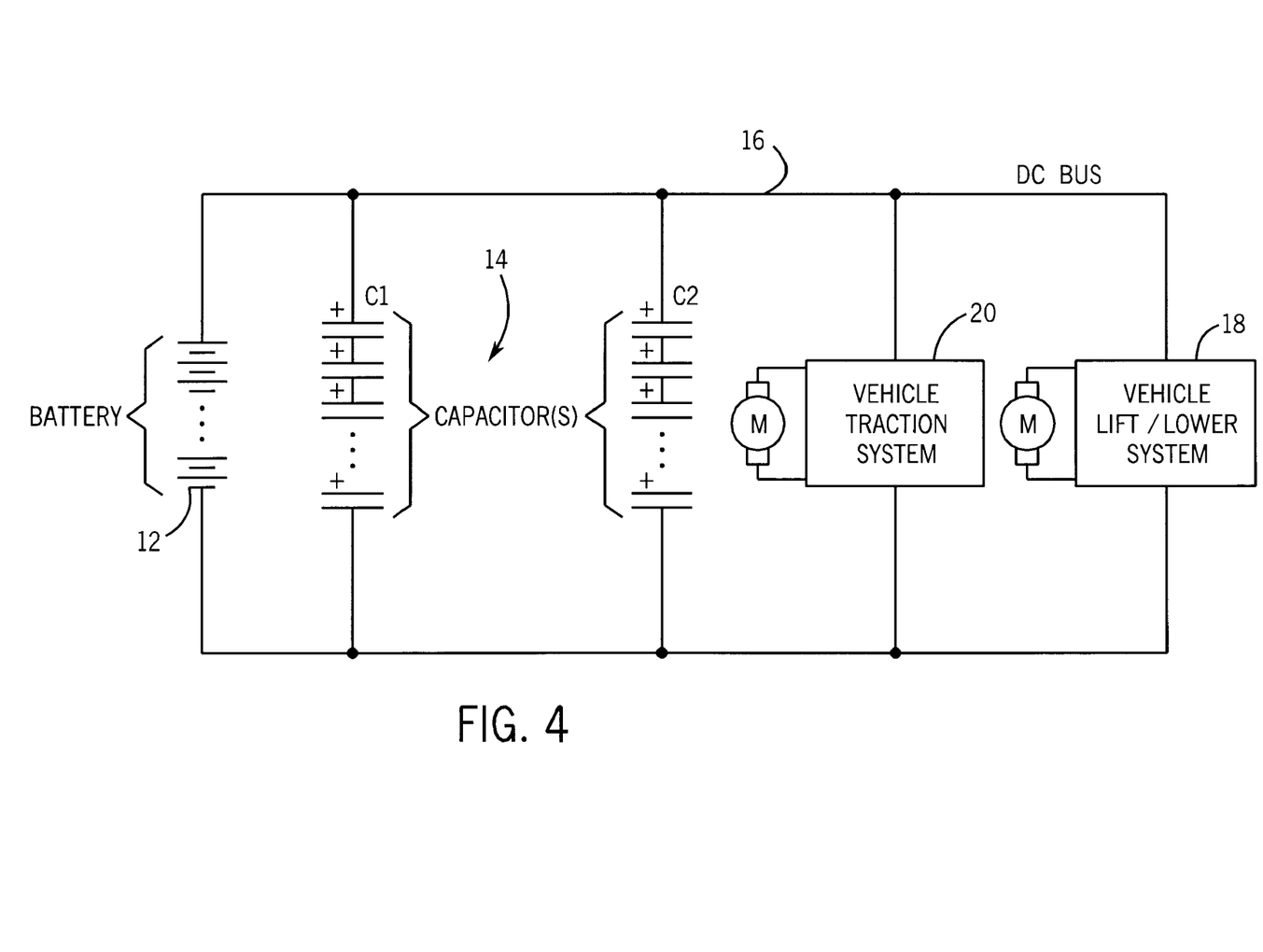
FIG. 4 is a block diagram of a third preferred embodiment of a lift truck power source.

Referring now to FIG. 4, in another alternative embodiment, the hybrid power system can comprise a storage battery 12 and capacitor bank 14 connected in parallel. Here, the storage battery 12 is sized to provide the main power supply necessary for driving the truck, and the capacitor bank 14 stores regenerated power as described above, and supplements the power supplied by the storage battery 12 during peak loads.

Referring again to FIG. 1, when the truck is not in service it can be parked in a conventional battery charging station and a charging circuit 40 may be connected to the DC bus 16 to fully charge the storage battery 12. Otherwise, the truck can remain in service until the hydrogen fuel for fuel cell 10 runs out and must be replenished. Fueling stations are disposed around the work place and it requires only 2 to 3 minutes to replenish the fuel as contrasted with 20 to 30 minutes to replace a battery or eight hours to charge a battery.

Figure 2:
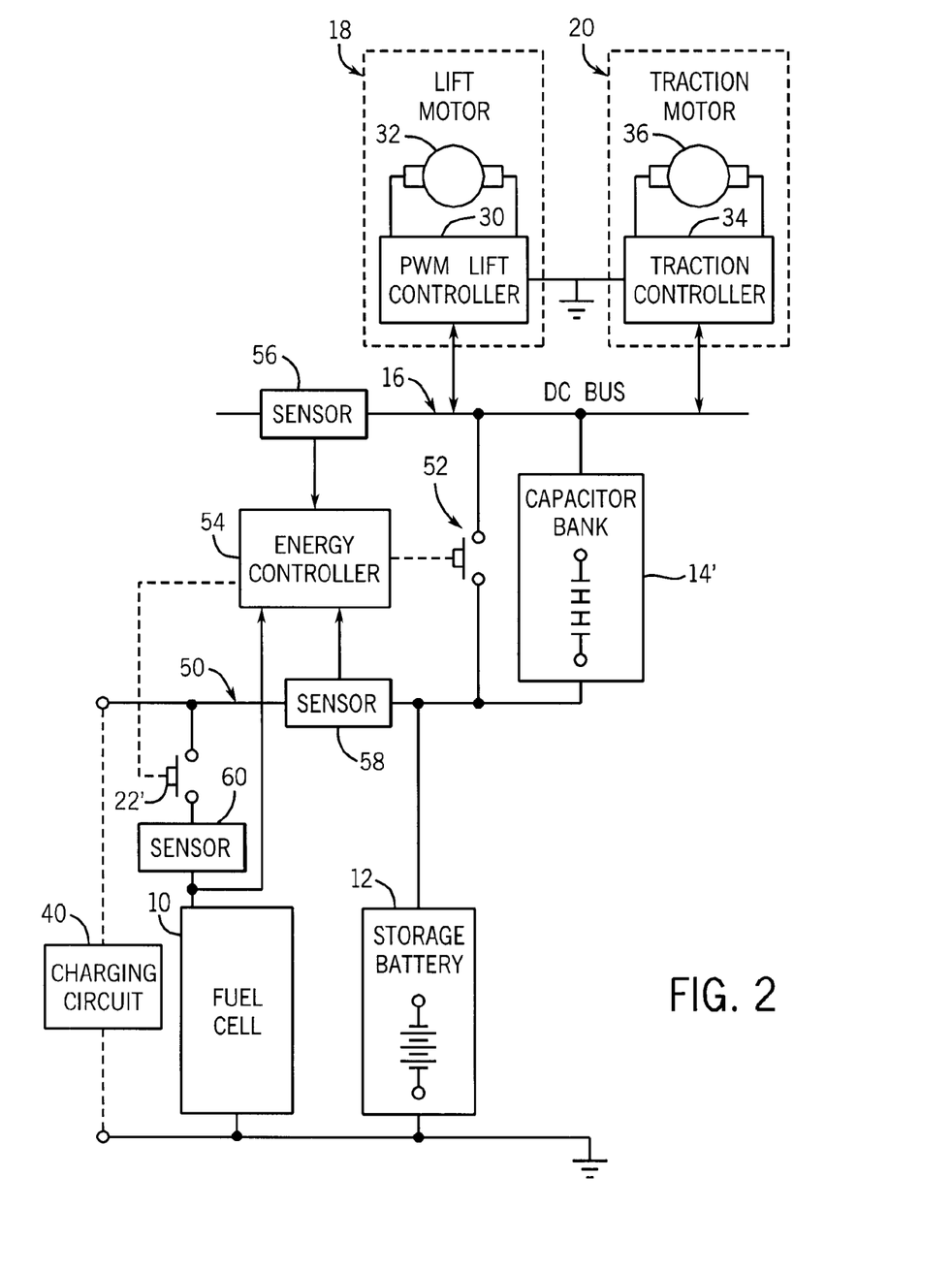
FIG. 2 is a block diagram of a second preferred embodiment of a lift truck power source.

Another preferred embodiment of the invention is shown in FIG. 2. Elements which are the same as those described above are indicated with the same reference numbers and their description will not be repeated. The primary distinction between this second embodiment and the first embodiment is that a capacitor bank 14' is connected in series with the storage battery 12 rather than in parallel. As will now be described, this enables the size of the capacitor bank 14' to be reduced over that of the first embodiment.

Referring to FIG. 2, the storage battery 12 and fuel cell 10 supply current to a primary bus 50 at the nominal DC bus voltage. The capacitor bank 14' connects between this primary bus 50 and the DC bus 16 such that it "sees" only the voltage on the DC bus 16 that is in excess of the nominal bus voltage. This over voltage situation occurs during regeneration of power by the lift system 18 and traction system 20 and, therefore, the capacitor bank 14' need only store the regenerated power at this "excess voltage" which is typically only 0 to 7.5 volts. In the above example system using a 36 volt nominal battery voltage, 17 series connected capacitors are needed in each capacitor bank. Only 2 or 3 series connected capacitors are needed in the second embodiment to work properly. If the number of capacitors in each bank is only three, the total capacitance of each bank is 867 Farads and the voltage across the capacitor bank 14' is limited to 7.5 volts in this example. The energy storage per bank is therefore, only 24,375 joules. While each bank of capacitors in this second embodiment stores less energy, more parallel banks may be added to provide the needed power storage capacity. Because the capacitors are used more fully in this second embodiment, far fewer total capacitors are needed in the capacitor bank 14' than in the first embodiment. That is, the three capacitors in the second embodiment are charged and discharged more completely as the DC bus voltage varies above nominal bus voltage during truck operation whereas the same voltage variations have far less effect on the charge in each capacitor of the 17 series connected capacitors in the first embodiment. Many capacitors in the first embodiment are needed to withstand the nominal bus voltage but they do not see as much change in voltage and hence the charge on each capacitor does not change as much.

While the size of the capacitor bank 14' in the second embodiment can be significantly reduced over that in the first embodiment, this benefit comes at a cost. More specifically, a switch 52 and associated energy controller 54 is needed for proper operation. The energy controller 54 monitors the voltages on buses 50 and 16 and it opens and closes the switch 52 that connects between these two buses. When the capacitor bank 14' is discharged and the truck needs power, the switch 52 is closed such that power is supplied to the truck directly from the fuel cell 10 or storage battery 12. On the other hand, if the truck needs power and the capacitor bank 14' is charged, the switch 52 is opened so that power is taken first from the capacitor bank 14' until it is discharged. And finally, if the capacitor bank 14' is discharged but power is being regenerated by one of the drive systems 18 or 20, the switch 52 is opened to enable the excess voltage on DC bus 16 to charge the capacitor bank 14'. Thus, regenerated power is stored in the capacitor bank 14' and sudden power demands are satisfied by first discharging the capacitor bank 14'.

Figure 5:
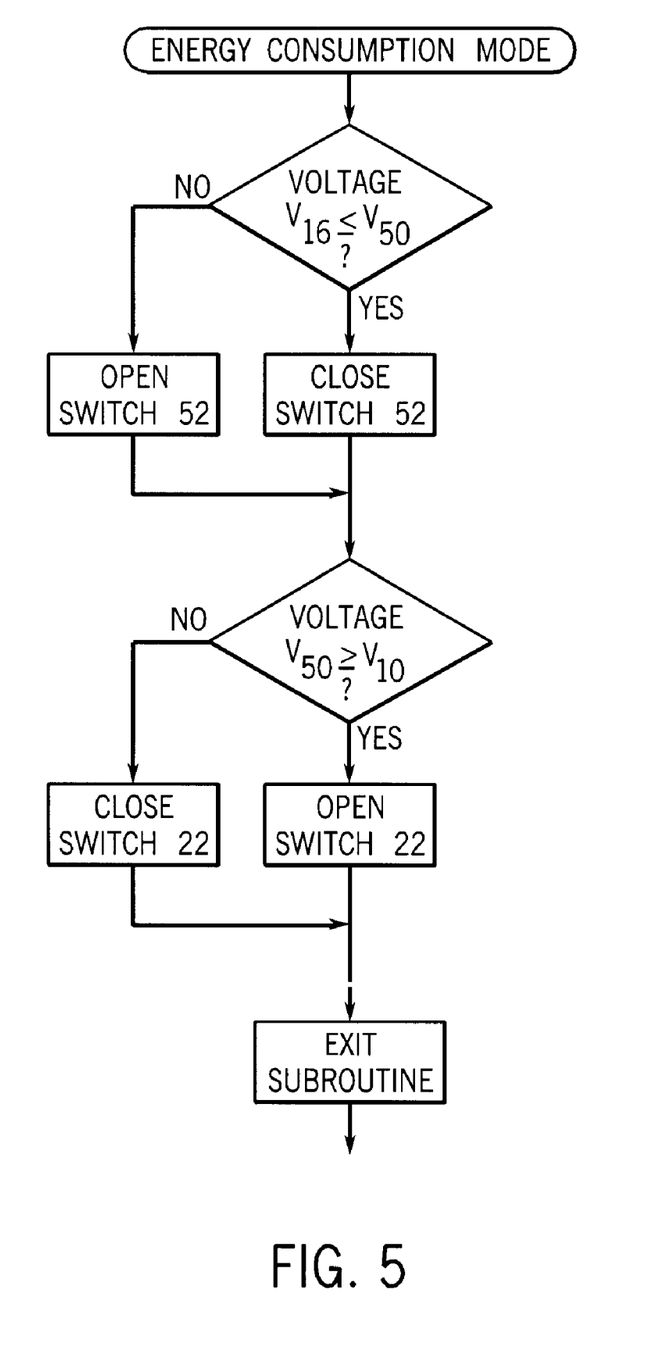
FIG. 5 is a flow chart illustrating operation of a control system for controlling power supply at FIG. 2 in an energy consumption mode.
Figure 6:
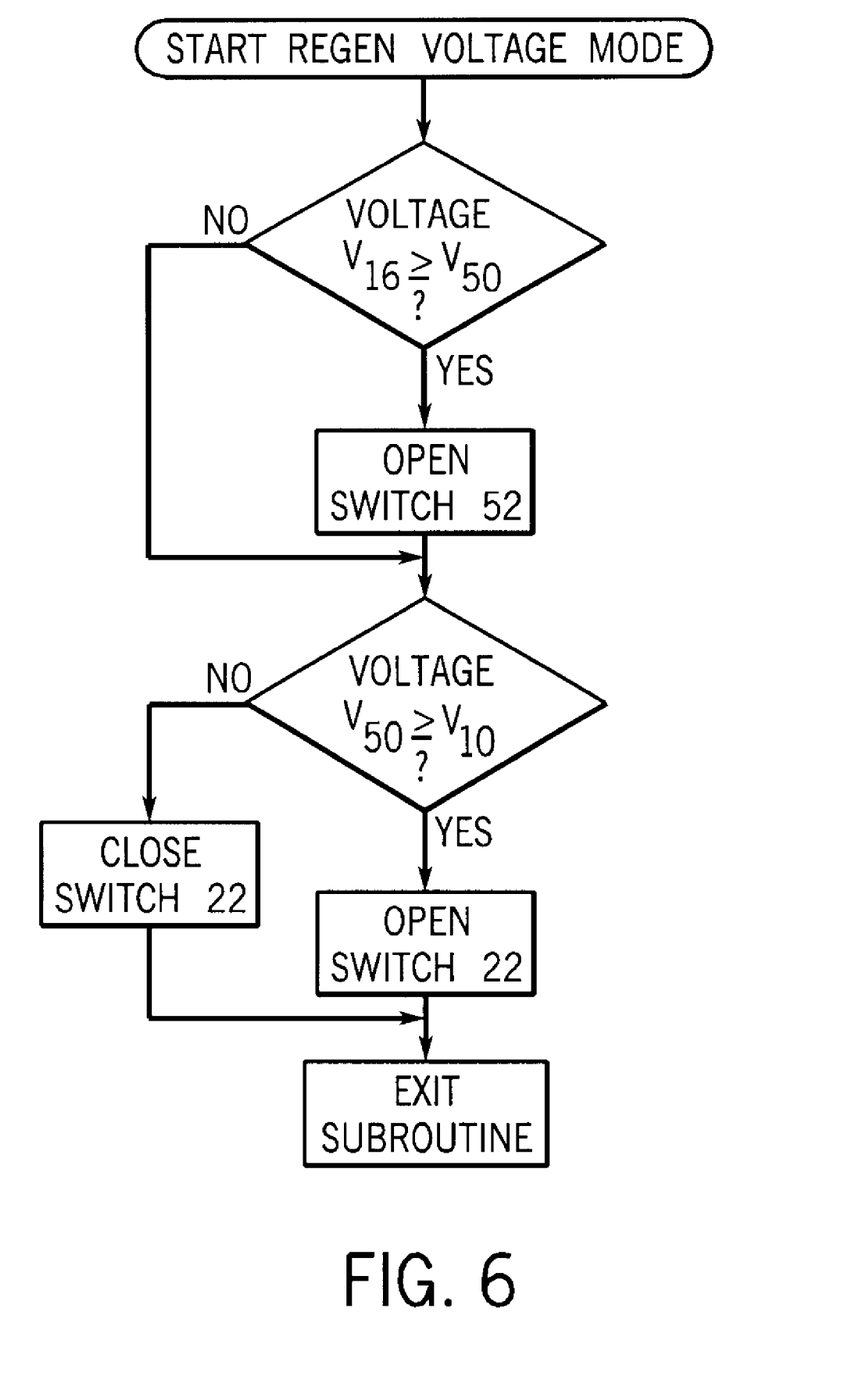
FIG. 6 is a flow chart illustrating operation of a control system for controlling the power supply of FIG. 2 in a regeneration mode.

Referring now specifically to FIGS. 5 and 6, operation of the energy controller 54 of the circuit of FIG. 2 is shown for each of an energy consumption mode, when the power supply is supplying energy to the lift system 18 and/or traction system 10, and in a regeneration mode, when the capacitors 14' are being recharged by regenerated power from the lift system 18 and traction system 20. Here, a first sensor 56 is provided to monitor both the voltage $V_{16}$ and current at the DC bus 16, a second sensor 58 is provided on the primary bus 50 to monitor the voltage $V_{50}$ here, and a third sensor 60 is provided at the output of the fuel cell 10 again to monitor voltage $V_{10}$ across the fuel cell.

Referring first to FIG. 5, the energy controller 54 enters the energy consumption mode when the first sensor 56 determines that current is flowing out of the DC bus 16 and into the load consisting of the lift system 18 and traction system 20. Once the energy consumption mode is entered, the energy controller 54 monitors the voltage $V_{16}$ on the DC bus 16 and $V_{50}$ on the primary bus 50 from the first and second sensors, 56 and 58, respectively. When the voltage $V_{16}$ is greater than the voltage $V_{50}$, the switch 52 is opened, allowing current to be drawn from the capacitor bank 14'. When the voltage $V_{16}$ falls below that of the voltage $V_{50}$, the switch 52 is closed, and current is supplied directly from the storage battery 12 and the fuel cell 10. or in applications where there is no fuel cell (FIG. 7), the power is drawn directly from the storage battery 12. When the voltage $V_{10}$ across the fuel cell 10 is greater than the voltage $V_{50}$, the switch 22' is closed, allowing the fuel cell 10 to supply additional power to the DC bus 16. When, however, the voltage $V_{50}$ is less than the voltage $V_{10}$, the switch 22' is opened, and power is supplied from the storage battery 12. Although the switch 22' is shown here as a switching element, various types of switching elements, including transistor and MOSFET switching circuits can also be used. A diode can also be used in place of the switching element.

The energy controller 54 determines that the power supply has entered the regeneration mode of FIG. 6 when the first sensor 56 determines that current is flowing back into the power supply from the DC bus 16. In this mode, the energy controller 54 monitors the voltage $V_{16}$ across the DC bus 16 to determine if this voltage is greater than the voltage $V_{50}$ across the primary bus 50, and if so, the switch 52 is opened to charge the capacitor bank 14'. If the voltage $V_{16}$ is less than the voltage $V_{50}$, however, the switch 52 remains closed. Again, as described above, when the voltage $V_{10}$ across the fuel cell 10 is greater than the voltage $V_{50}$ (across storage battery 12), the switch 22 is closed, allowing the fuel cell 10 to supply power to the storage battery 12. When, however, the voltage $V_{50}$ is less than the voltage $V_{10}$, the switch 22 is opened, and power is supplied directly from the storage battery 12.

Figure 7:
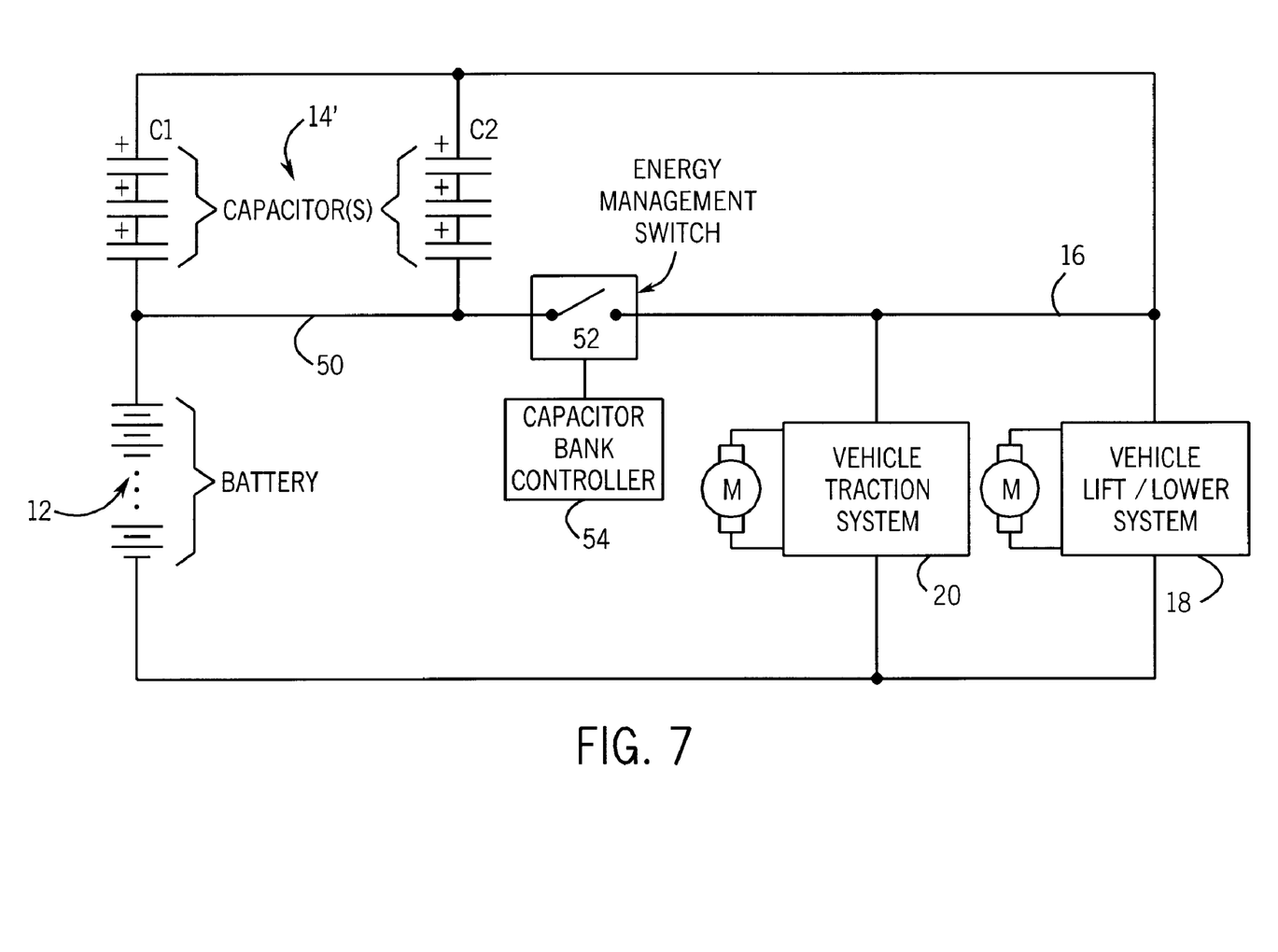
FIG. 7 is a block diagram of a fourth preferred embodiment of a lift truck power source.

In an alternative embodiment shown in FIG. 7, the hybrid power supply comprises a storage battery 12 connected in series with the capacitor bank 14'. The power supply of this system operates substantially as described above, with the capacitor bank 14' storing regenerated energy and supplying power to the load when charged, and the storage battery 12 providing power when the switch is closed.

It should be understood that the methods and apparatuses described above are only exemplary and do not limit the scope of the invention, and that various modifications could be made by those skilled in the art that would fall under the scope of the invention. To apprise the public of the scope of the invention, the following claims are made:

The invention claimed is:

1. A power source for a lift truck which comprises:
a DC bus connected to supply current to a lift system and a traction system on the lift truck;
a fuel cell mounted on the lift truck and being operable to produce a supply of DC current from a supply of hydrogen;
a storage battery mounted on the lift truck and coupled to the fuel cell in parallel;
a capacitor bank mounted on the lift truck and connected to the DC bus in series with said storage battery and fuel cell; and
a switch connected between the DC bus and the fuel cell and the storage battery, the switch being operable to connect the fuel cell and storage battery directly to the DC bus bypassing said capacitor bank when the lift truck requires DC current and the capacitor bank is discharged.

2. The power source of claim 1, wherein the switch is operable to connect the capacitor bank to the DC bus to store energy when either of the lift system or the traction system regenerates current to the DC bus and to supply DC current to the DC bus when the capacitor bank is charged and current is demanded by the truck.

3. The power source of claim 1, wherein the capacitor bank comprises supercapacitors.

4. The power source of claim 1, wherein the fuel cell is selectively connected to the storage battery through a switching circuit.

5. The power source of claim 1, wherein the capacitor bank comprises at least one supercapacitor.

6. A power source for a lift truck which comprises:
a DC bus connected to supply current to a lift system and a traction system on the lift truck;
a fuel cell mounted on the lift truck and being operable to produce a selected supply of DC current from a supply of hydrogen and couple the DC current to the DC bus;
a storage battery mounted on the lift truck and coupled to the DC bus in parallel with said fuel cell, the storage battery being operable to supply DC current to the DC bus; and
a capacitor bank mounted on the lift truck and coupled to the DC bus in series with said storage battery and fuel cell, the capacitor bank being operable to store energy when the lift system regenerates current to the DC bus and being operable to supply DC current to the DC bus when the capacitor bank is charged and the current demand of the truck is greater than the selected supply from the fuel cell.

7. The lift truck of claim 6, wherein the storage battery is operable to supply current to the DC bus when the current demand of the lift truck is more than the selected supply from the fuel cell and to store energy when the current demand of the lift truck is less than the selected supply from the fuel cell.

8. The lift truck of claim 6, wherein the capacitor bank is further operable to store energy when the traction system regenerates current to the DC bus.

9. The lift truck of claim 6, wherein the fuel cell is connected to the DC bus through a diode.

10. The lift truck of claim 6, wherein the fuel cell is connected to the DC bus through a switch circuit.

* * * * *